United States Patent
Iwasaki et al.

(10) Patent No.: US 9,231,248 B2
(45) Date of Patent: Jan. 5, 2016

(54) ELECTRODE, NONAQUEOUS ELECTROLYTE BATTERY, AND BATTERY PACK

(71) Applicants: Takuya Iwasaki, Uenohara (JP); Hiroki Inagaki, Yokohama (JP); Kazuhiro Yasuda, Yokohama (JP); Keigo Hoshina, Yokohama (JP); Mitsuru Ishibashi, Yokohama (JP); Yorikazu Yoshida, Yokohama (JP); Norio Takami, Yokohama (JP)

(72) Inventors: Takuya Iwasaki, Uenohara (JP); Hiroki Inagaki, Yokohama (JP); Kazuhiro Yasuda, Yokohama (JP); Keigo Hoshina, Yokohama (JP); Mitsuru Ishibashi, Yokohama (JP); Yorikazu Yoshida, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/679,182

(22) Filed: Nov. 16, 2012

(65) Prior Publication Data
US 2013/0122349 A1    May 16, 2013

(30) Foreign Application Priority Data
Nov. 16, 2011    (JP) .................................. 2011-250549

(51) Int. Cl.
| H01M 4/02 | (2006.01) |
| H01M 4/485 | (2010.01) |
| H01M 2/02 | (2006.01) |
| H01M 4/131 | (2010.01) |
| H01M 10/0525 | (2010.01) |

(52) U.S. Cl.
CPC ................ *H01M 4/485* (2013.01); *H01M 2/02* (2013.01); *H01M 2/0207* (2013.01); *H01M 4/131* (2013.01); *H01M 10/0525* (2013.01); *H01M 2004/021* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 7,662,515 | B2 | 2/2010 | Inagaki et al. |
| 7,829,224 | B2 | 11/2010 | Inagaki et al. |
| 7,972,730 | B2 | 7/2011 | Inagaki et al. |
| 8,133,619 | B2 | 3/2012 | Inagaki et al. |

(Continued)

FOREIGN PATENT DOCUMENTS

| CN | 101427416 A | 5/2009 |
| JP | 2007-18882 | 1/2007 |
| JP | 2008-243729 | 10/2008 |

OTHER PUBLICATIONS

Armstrong (TiO2(B) nanotubes as negative electrodes for rechargeable lithium batteries, Electrochemical and Solid-State Letters, 9, (3) A139-A143 (2006).*

(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, an electrode includes a current collector, an active material-containing layer, a first peak, a second peak and a pore volume. The active material-containing layer contains an active material having a lithium absorption potential of 0.4 V (vs. Li/Li$^+$) or more. The first peak has a mode diameter of 0.01 to 0.1 μm in a diameter distribution of pores detected by mercury porosimetry. The second peak has a mode diameter of 0.2 μm (exclusive) to 1 μm (inclusive) in the diameter distribution of pores. The pore volume detected by the mercury porosimetry is within a range of 0.1 to 0.3 mL per gram of a weight of the electrode excluding a weight of the current collector.

19 Claims, 7 Drawing Sheets

(56) References Cited

U.S. PATENT DOCUMENTS

| | | |
|---|---|---|
| 2007/0009798 A1* | 1/2007 | Inagaki et al. ............. 429/231.1 |
| 2008/0241692 A1 | 10/2008 | Saruwatari et al. |
| 2009/0169997 A1* | 7/2009 | Saruwatari et al. ........... 429/221 |
| 2012/0141871 A1 | 6/2012 | Inagaki et al. |

OTHER PUBLICATIONS

U.S. Appl. No. 13/654,110, filed Oct. 17, 2012, Hiroki Inagaki, et al.

Chinese Office Action dated Aug. 4, 2014 (w/English Translation).

A. Armstrong, et al., "$TiO_2$-B nanowires as negative electrodes for rechargeable lithium batteries", Journal of Power Sources, vol. 146, 2005, pp. 501-506.

Office Action issued Sep. 2, 2014, in Japanese Patent Application No. 2011-250549, filed Nov. 16, 2011 (with English-language Translation).

Office Action issued May 15, 2015 in Chinese Patent Application No. 201210382094.4 (with English language translation).

* cited by examiner

ELECTRODE, NONAQUEOUS ELECTROLYTE BATTERY, AND BATTERY PACK

CROSS-REFERENCE TO RELATED APPLICATIONS

This application is based upon and claims the benefit of priority from Japanese Patent Application No. 2011-250549, filed Nov. 16, 2011, the entire contents of which are incorporated herein by reference.

FIELD

Embodiments described herein relate to an electrode, a nonaqueous electrolyte battery and a battery pack.

BACKGROUND

A nonaqueous electrolyte battery such as a lithium ion secondary battery is now widely used as a high energy density battery in various fields including electric vehicles, electric storage, information appliances, and the like. Accordingly, demands from the market have increased, and studies of the nonaqueous electrolyte battery have been intensively developed.

Among others, the nonaqueous electrolyte battery used as a power source for an electric vehicle is required to have a high energy density, i.e. a large discharge capacity per unit weight or unit volume. Further, in order to regenerate kinetic energy in deceleration, the nonaqueous electrolyte battery is required to be capable of efficient charging even in the case where a large current is suddenly inputted to the battery. On the other hand, the nonaqueous electrolyte battery is required to be capable of immediately discharging a large output, i.e. a large current, in the cases of starting, sudden starting, sudden acceleration, and the like. In short, the secondary battery as the electric vehicle power source desirably has a large capacity and a good input/output performance in short time.

Carbonaceous materials have been used as negative electrode active materials of the nonaqueous electrolyte battery, and spinel type lithium titanate having a high lithium absorption/release potential as compared to the carbonaceous materials has recently been attracting attention. Since the spinel type lithium titanate is not subject to a volume change which is attributable to charge-discharge reactions, it has great advantages of an excellent cycle performance, a high safely owing to the low possibility of generation of lithium dendrite and the like as compared to the case of using the carbonaceous material, and being less subject to thermal runaway because it is a ceramic.

Conversely, the nonaqueous electrolyte battery using spinel type lithium titanate as the negative electrode active material has a problem of a low energy density, and there is a demand for a negative electrode material which enables to attain a high capacity. Therefore, studies on titanium oxide compounds, such as $TiO_2$, having a larger theoretical capacity per unit weight than the spinel type lithium titanate $Li_4Ti_5O_{12}$ have been conducted.

Recently, it has been reported that titanium oxide having a monoclinic system β-type structure which is one of crystal structures of $TiO_2$ is promising as a high capacity battery material.

DETAILED DESCRIPTION

According to one embodiment, there is provided an electrode including a current collector, an active material-containing layer, a first peak, a second peak and a pore volume. The active material-containing layer is formed on the current collector. The active material-containing layer contains an active material having a lithium absorption potential of 0.4 V (vs. Li/Li$^+$) or more. The first peak has a mode diameter of 0.01 to 0.1 μm in a diameter distribution of pores detected by mercury porosimetry. The second peak has a mode diameter of 0.2 μm (exclusive) to 1 μm (inclusive) in the diameter distribution of pores. The pore volume detected by the mercury porosimetry is within a range of 0.1 to 0.3 mL per gram of a weight of the electrode excluding a weight of the current collector.

According to another one embodiment, there is provided a nonaqueous electrolyte battery including a positive electrode, the electrode according to the above-described embodiment as a negative electrode, and a nonaqueous electrolyte.

According to yet another one embodiment, there is provided a battery pack including the nonaqueous electrolyte battery according to the above-described embodiment.

Hereinafter, the embodiments are described with reference to the drawings. Structures common through the embodiments are denoted by an identical reference numeral, and an overlapping description thereof is not repeated. Further, the drawings are schematic diagrams which are for the purposes of illustration and promoting understanding of the embodiments, and, though some of shapes, dimensions, ratios, and the like of the drawings are different from those of the actual devices, the shapes, dimensions, ratios, and the like can appropriately be designed and changed by taking the following description and the well-known art into consideration.

(First Embodiment)

According to the first embodiment, there is provided an electrode including a current collector and an active material-containing layer formed on the current collector. The active material-containing layer may be formed on one surface or both surfaces of the current collector. An active material contained in the active material-containing layer has a lithium absorption potential of 0.4 V (vs. Li/Li$^+$) or more. The electrode has, in a diameter distribution of pores detected by mercury porosimetry, a first peak having a mode diameter of 0.01 μm or more and 0.1 μm or less and a second peak having a mode diameter which exceeds 0.2 μm and is equal to or less than 1 μm. A volume of pores of the electrode detected by the mercury porosimetry is 0.1 mL or more and 0.3 mL or less per gram of a weight of the electrode (excluding a weight of the current collector).

The reasons for defining the lithium absorption potential of the active material to the above-specified range are as follows. With the use of an active material (e.g. graphite, lithium metal, or the like) which absorbs lithium ions at a potential less than 0.4 V (vs. Li/Li$^+$), metal lithium is precipitated on a surface of the electrode to grow in the form of a dendrite when an input-output at a large current is repeated. Accordingly, internal short-circuiting is caused during the input-output at large current. With the use of the active material having the lithium absorption potential of 0.4 V (vs. Li/Li$^+$) or more, the precipitation of metal lithium on the electrode surface is suppressed, and the short-circuiting during the input-output at large current is avoided. Therefore, the lithium absorption potential of the active material may preferably be 0.4 V (vs. Li/Li$^+$) or more, and an upper limit thereof may preferably be 3 V (vs. Li/Li$^+$). A more preferred range is 0.4 V (vs. Li/Li$^+$) or more and 2 V (vs. Li/Li$^+$) or less.

The active material which is capable of absorbing lithium ions within the range of 0.4 V (vs. Li/Li$^+$) or more may preferably be a metal oxide, a metal sulfide, a metal nitride, or an alloy.

Examples of the metal oxide include titanium-containing metal composite oxide, tin-based oxide such as $SnB_{0.4}P_{0.6}O_{3.1}$ or $SnSiO_3$, silicon-based oxide such as SiO, tungsten-based oxide such as $WO_3$, and the like. Among these, the titanium-containing metal composite oxide is preferred.

Examples of the titanium-containing metal composite oxide include titanium-based oxide which is free from lithium at the stage of oxide synthesis, lithium titanium oxide, lithium titanium composite oxide in which a part of constituent elements of lithium titanium oxide is substituted with a different element, and the like. Examples of the lithium titanium oxide include lithium titanate having a spinel structure [e.g. $Li_{4+x}Ti_5O_{12}$ (x is a value which is capable of changing by charge-discharge and satisfies 0≤x≤3)], lithium titanate of a ramsdellite type [e.g. $Li_{2+y}Ti_3O_7$ (y is a value which is capable of changing by charge-discharge and satisfies 0≤y≤3)], and the like.

Examples of the titanium-based oxide include $TiO_2$, a metal composite oxide containing Ti and at least one element selected from the group consisting of V, Sn, Cu, Ni, Co, and Fe, and the like. The titanium composite oxide having a monoclinic system β-type structure which is one of crystal structures of $TiO_2$ is promising as a battery material. Hereinafter, the titanium oxide having the monoclinic system β-type structure among the titanium composite oxides having the monoclinic system β-type structure is referred to as $TiO_2(B)$. $TiO_2(B)$ and those obtainable by substituting a part of constituent elements of $TiO_2(B)$ with a different element (e.g. Li) are encompassed by the titanium composite oxides having monoclinic system β-type structure.

Examples of the metal composite oxide containing Ti and at least one element selected from the group consisting of V, Sn, Cu, Ni, Co, and Fe include $TiO_2$—$V_2O_5$, $TiO_2$—$P_2O_5$—$SnO_2$, $TiO_2$—$P_2O_5$—MeO (Me is at least one element selected from the group consisting of Cu, Ni, Co, and Fe), and the like. The metal composite oxide may preferably have a microstructure in which a crystalline phase and an amorphous phase coexist or an amorphous phase alone exists. The cycle performance is largely improved by the microstructure.

Examples of the metal sulfide include titanium-based sulfide such as $TiS_2$, molybdenum-based sulfide such as $MoS_2$, iron-based sulfide such as FeS, $FeS_2$, or $Li_xFeS_2$ (0≤x≤4), and the like.

Examples of the metal nitride include lithium-based nitride [e.g. (Li, Me)$_3$N (Me is a transition metal element)], and the like.

Among the above active materials, those containing the titanium composite oxide having monoclinic system β-type structure are preferred. The titanium composite oxide having monoclinic system β-type structure is in the form of secondary particles resulting from aggregation of fibrous primary particles. Since an electric path between the primary particles is disconnected due to collapse of the aggregation form of the secondary particles when the density of the electrode using the active material containing the titanium composite oxide having monoclinic system β-type structure is increased, the input-output performance of the battery can be deteriorated. With the use of the active material containing the titanium composite oxide having monoclinic system β-type structure for the electrode according to the embodiment, it is possible to attain a high density while maintaining the secondary particle form, and, therefore, it is possible to densely form the electric path between the primary particles and between the secondary particles. Further, an excellent nonaqueous electrolyte impregnation property is attained while attaining the high density. Consequently, it is possible to realize a nonaqueous electrolyte battery having high energy density and excellent input-output performance, which utilizes one of the characteristics, i.e. the high energy density, of the titanium composite oxide having monoclinic system β-type structure.

The number of kinds of the active material to be used may be one or two or more.

The active material is in the form of containing the secondary particles containing aggregation of the primary particles. The electrode of the embodiment is capable of improving the density while maintaining the aggregation form of the secondary particles in the active material. As a result, both of conduction in the secondary particle and conduction between the secondary particles are improved. Insofar as the secondary particles are contained, a part of the primary particles may be remained as they are. In short, the active material may contain the primary particles each existing as an independent particle and the secondary particles formed by aggregation of the primary particles. The active material containing the secondary particles and the independent primary particles may preferably have a primary particle diameter of 0.1 μm or more and 10 μm or less and a secondary particle diameter of 1 μm or more and 30 μm or less. By maintaining the primary particle diameter and the secondary particle diameter within the above-specified range, deterioration of the active material which is caused by a reaction with the nonaqueous electrolyte is suppressed. A more preferred range of the primary particle diameter is 0.5 μm or more and 3 μm or less, and a preferred range of the secondary particle diameter is 10 μm or more and 20 μm or less.

It is possible to measure the primary particle diameter and the secondary particle diameter of the active material by laser diffractometry.

In the case of using the active material containing the titanium composite oxide having monoclinic system β-type structure, a specific surface area of the titanium composite oxide having monoclinic system β-type structure, which is detected by a BET method based on $N_2$ absorption, may preferably be 1 m$^2$/g or more and 30 m$^2$/g or less. Since an effective area contributing to an electrode reaction is increased by setting the specific surface area to 1 $m^2/g$ or more, a high large current discharge performance is attained. Further, since a reaction between the negative electrode and the nonaqueous electrolyte is suppressed by setting the specific surface area to 30 $m^2/g$ or less, a reduction in charge-discharge efficiency and gas generation during storage are suppressed. A more preferred range of the specific area is 10 $m^2/g$ or more and 20 $m^2/g$ or less.

A diameter distribution of pores detected by mercury porosimetry is indicated by using a Log differential intrusion as the vertical axis and a pore diameter as the horizontal axis. A mode diameter means a pore diameter at a peak position of the diameter distribution of pores. A peak which appears within a pore diameter range of 0.01 μm or more and 0.1 μm or less is a first peak, and the pore diameter which gives the first peak is a first mode diameter. A peak which appears within a pore diameter range exceeding 0.2 μm and being 0.1 μm or less is a second peak, and the pore diameter which gives the second peak is a second mode diameter. A peak height of the first peak may preferably be higher than a peak height of the second peak. It is considered that the first peak represents a pore or pores between the primary particles and that the second peak represents a pore or pores between the secondary particles.

The reason for setting the first mode diameter to the range of 0.01 μm or more and 0.1 μm or less is as follows. When the first mode diameter is less than 0.01 μm, the impregnation of the nonaqueous electrolyte into the electrode is deteriorated to thereby deteriorate the input-output performance of the battery. In contrast, when the first mode diameter exceeds 0.1 μm, the aggregation form of the secondary particles is collapsed to increase the active material which exists in the form of the primary particles, thereby disconnecting the conduction path between the active material particles, resulting in deterioration of the input-output performance of the battery. A more preferred range of the first mode diameter is 0.03 μm or more and 0.05 μm or less.

The reason for setting the second mode diameter to the range exceeding 0.2 μm and being 1 μm or less is as follows. Even in the case where the first mode diameter is within the range of 0.01 μm or more and 0.1 μm or less, the aggregation form of the secondary particles is collapsed when the second mode diameter is 0.2 μm or less to increase the active material which exists in the form of the primary particles, thereby causing disconnection of the conduction path between the active material particles, resulting in deterioration of the input-output performance of the battery. Since the aggregation form of the secondary particles is maintained by setting the second mode diameter to larger than 0.2 μm, good conduction between active material particles is expected. However, when the second mode diameter exceeds 1 μm, the conduction path between active material particles is disconnected by large pores existing in the active material-containing layer, or the nonaqueous electrolyte is unevenly distributed to the large pores, resulting in deterioration of the input-output performance of the battery. A more preferred range of the second mode diameter exceeds 0.2 μm and is equal to or less than 0.5 μm.

The reason for setting a pore volume detected by the mercury porosimetry to 0.1 mL or more and 0.3 mL or less per gram of a weight of the electrode (excluding a weight of the current collector) is as follows. When a pore volume per gram of the electrode weight (excluding current collector weight) is less than 0.1 mL, the input-output performance of the battery is deteriorated even when the first peak and the second peak are attained. The deterioration is due to insufficient nonaqueous electrolyte retention in the electrode. Further, when the pore volume per gram of electrode weight (excluding current collector weight) exceeds 0.3 mL, a density of the electrode is lowered to reduce an energy density of the battery. A more preferred range of the pore volume is 0.13 mL/g or more and 0.2 mL/g or less. Since a poreless substrate (e.g. metal foil) is used as the current collector, the weight which is detected by subtracting the current collector weight from the electrode weight is used in order to exclude influence of the current collector in which no pore exists.

The density of the electrode may preferably be 1.9 $g/cm^3$ or more and less than 2.1 $g/cm^3$. The energy density of the electrode is improved by setting the electrode density to 1.9 $g/cm^3$ or more. Further, the electrode having the second peak is easily obtained by setting the electrode density to less than 2.1 $g/cm^3$. A more preferred range of the electrode density is 1.8 $g/cm^3$ or more and less than 2.1 $g/cm^3$.

The electrode is produced by, for example, suspending the active material, a conductive agent, and a binder into an appropriate solvent, and coating the suspension on the current collector, followed by drying and pressing, thereby obtaining a strip-shaped electrode.

As the conductive agent, a carbonaceous material such as cokes, carbon black, or graphite may be used. An average particle diameter of the carbonaceous material may preferably be 0.1 μm or more in order to effectively suppress the gas generation and may preferably be 10 μm or less in order to construct the good conduction network. Likewise, a specific surface area of the carbonaceous material may preferably be 10 $m^2/g$ or more in order to construct a good conduction network and may preferably be 100 $m^2/g$ or less in order to effectively suppress the gas generation.

As a binder, polyvinylidene fluoride (PVdF), an acrylic rubber, or an acrylic resin may be used.

A mixing ratio among the negative electrode active material, the conductive agent, and the binder may preferably be within such a range that 67 to 97.5 wt % of the negative electrode, 2 to 28 wt % of the conductive agent, and 0.5 to 5 wt % of the binder are mixed.

As the current collector, a metal foil such as an aluminum foil or an aluminum alloy foil may be used.

A thickness of the aluminum foil or the aluminum alloy foil may preferably be 20 μm or less, more preferably 15 μm or less. A purity of the aluminum foil may preferably be 99 wt % or more. As the aluminum alloy, an alloy containing an element such as magnesium, zinc, or silicon is preferred. On the other hand, a content of a transition metal such as iron, copper, nickel, or chrome may preferably be 1 wt % or less.

According to the first embodiment, the electrode density is increased while maintaining the particle form of the active material since the electrode contains the active material having the lithium absorption potential of 0.4 V (vs. Li/Li$^+$) or more, and the electrode has the first peak having the mode diameter of 0.01 μm or more and 0.1 μm or less and the second peak having the mode diameter exceeding 0.2 μm and being 1 μm or less in the diameter distribution of pores detected by mercury porosimetry, and the electrode has the pore volume per gram of the electrode weight (excluding current collector weight) detected by mercury porosimetry of 0.1 mL or more and 0.3 mL or less. As a result, good conduction is attained between the active material particles. Further, excellent nonaqueous electrolyte impregnation property is attained while maintaining the high density. Consequently, it is possible to provide a nonaqueous electrolyte battery which is excellent in input-output performance at large current with the use of the electrode according to the first embodiment as a positive electrode or a negative electrode.

(Second Embodiment)

According to the second embodiment, a nonaqueous electrolyte battery containing a positive electrode, the electrode according to the first embodiment as a negative electrode, and a nonaqueous electrolyte is provided.

Figure 1:
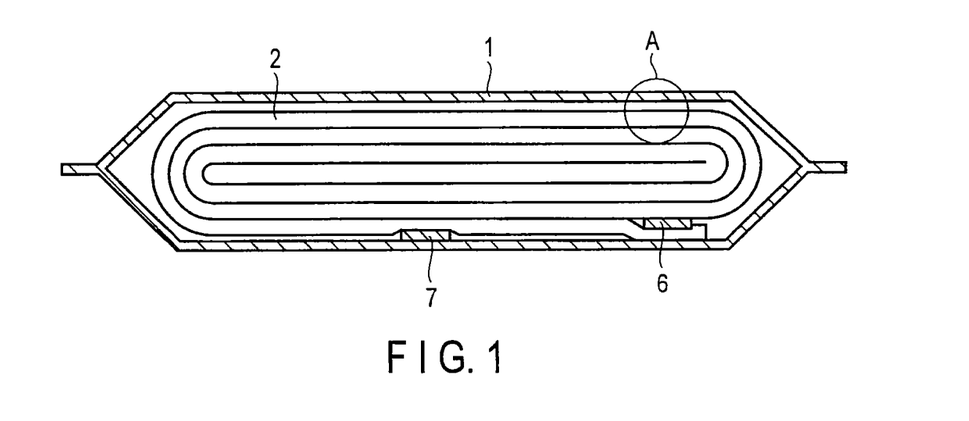
FIG. 1 is a sectional view showing a nonaqueous electrolyte battery according to a second embodiment.
Figure 2:
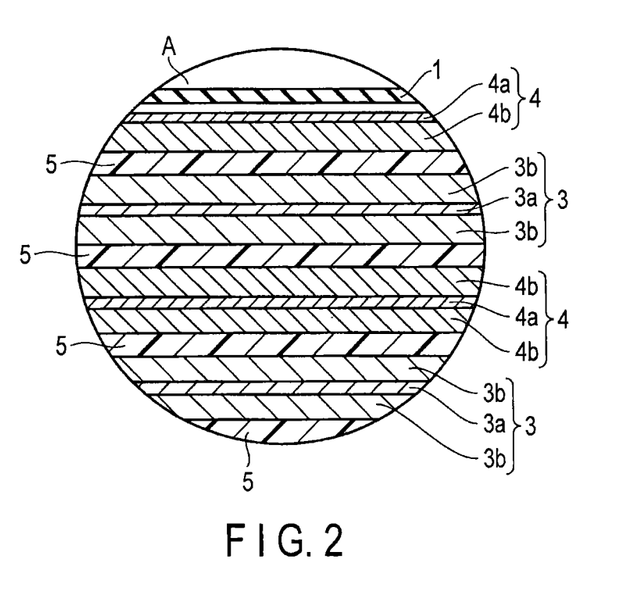
FIG. 2 is an enlarged sectional view showing a part-A of FIG. 1.

One example of the nonaqueous electrolyte battery according to the second embodiment will be described in detail with reference to FIG. 1 to FIG. 3. FIG. 1 is a sectional view showing a flat-type nonaqueous electrolyte battery which is one example of the nonaqueous electrolyte battery according to the second embodiment, FIG. 2 is an enlarged sectional view showing a part-A of FIG. 1, and FIG. 3 is a schematic diagram showing a vicinity of boundaries among a positive electrode active material-containing layer, a porous separator, and a negative electrode active material-containing layer in the secondary battery described in FIG. 1.

As shown in FIG. 1, an electrode group 2 is housed in a case 1 made from, for example, a film. The electrode group 2 has such a structure that a positive electrode 3 and a negative electrode 4 are wound in the form of a flat shape via a separator 5. As shown in FIG. 2, the positive electrode 3 includes a positive electrode current collector 3a and a positive electrode active material-containing layer 3b formed on at least one surface of the positive electrode current collector 3a. The negative electrode 4 includes a negative electrode current collector 4a and a negative electrode active material-containing layer 4b formed on at least one surface of the negative electrode current collector 4a. The separator 5 is disposed between the positive electrode active material-containing layer 3b and the negative electrode active material-containing layer 4b.

Figure 3:
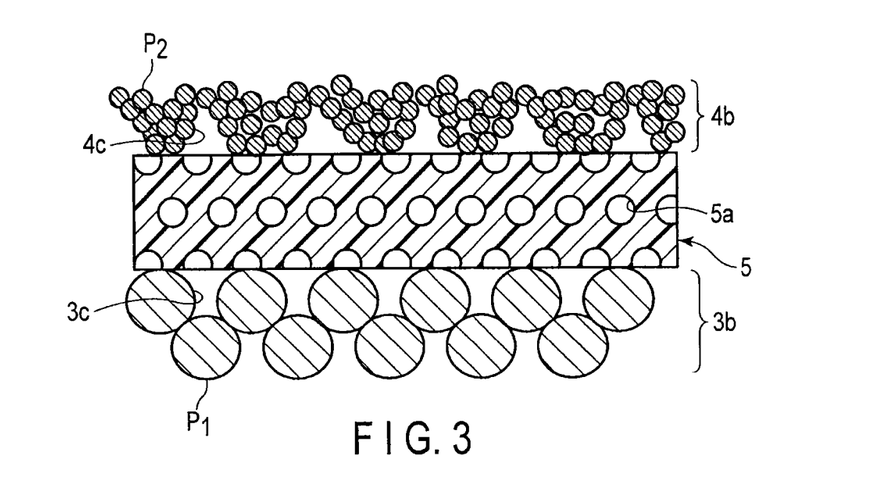
FIG. 3 is a schematic diagram showing a vicinity of boundaries among a positive electrode, a separator, and a negative electrode.

As shown in FIG. 3, each of the positive electrode active material-containing layer 3b, the negative electrode active material-containing layer 4b, and the separator 5 is porous. The nonaqueous electrolyte is, for example, retained in a clearance 3c between positive electrode materials $P_1$ in the positive electrode active material-containing layer 3b, a clearance 4c between negative electrode materials $P_2$ in the negative electrode active material-containing layer 4b, and a clearance 5a in the separator 5. The separator 5 which retains the nonaqueous electrolyte in the clearance 5a functions as an electrolyte plate. An adhesive polymer may be retained in the clearances 3c, 4c, and 5c together with the nonaqueous electrolyte.

A strip-shaped positive electrode terminal 6 is connected to the positive electrode current collector 3a of the electrode group 2, of which a leading end is lead out to the outside of the case 1. Further, a strip-shaped negative electrode terminal 7 is connected to the negative electrode current collector 4a of the electrode group 2, of which a leading end is lead out to the outside of the case 1. The positive electrode terminal 6 and the negative electrode terminal 7 are lead out from an identical side of the case 1, and a leading direction of the positive electrode terminal 6 and a leading direction of the negative electrode terminal 7 are identical to each other.

The negative electrode current collector 4a may be positioned at an outermost layer of the electrode group 2, and at least a part of the surface of the outermost layer may be coated with an adhesive portion. Thus, the electrode group 2 is adhered to the case 1.

Hereinafter, the positive electrode, the separator, the non-aqueous electrolyte, and the case will be described.

1) Positive Electrode

The positive electrode comprises the positive electrode current collector, and the positive electrode active material-containing layer which is supported on one surface or both surfaces of the positive electrode current collector, and includes an active material and a binder.

As the positive electrode active material, various oxides, sulfides, polymers, or the like are usable. Examples of the positive electrode active material include manganese dioxide ($MnO_2$), iron oxide, copper oxide, nickel oxide, lithium-manganese composite oxide (e.g. $Li_xMn_2O_4$ or $Li_xMnO_2$), lithium-nickel composite oxide (e.g. $Li_xNiO_2$), lithium-cobalt composite oxide (e.g. $Li_xCoO_2$), lithium-nickel-cobalt composite oxide (e.g. $LiNi_{1-y}CoyO_2$), lithium-manganese-cobalt composite oxide (e.g. $LiMn_yCo_{1-y}O_2$), spinel type lithium-manganese-nickel composite oxide (e.g. $Li_xMn_{2-y}Ni_yO_4$), lithium phosphorus oxide having olivine structure (e.g. $Li_xFePO_4$, $Li_xFe_{1-y}Mn_yPO_4$, $Li_xCoPO_4$, etc.), iron sulfate (e.g. $Fe_2(SO_4)_3$), vanadium oxide (e.g. $V_2O_5$), and the like. Other examples include a conductive polymer material such as polyaniline or polypyrrole, a disulfide-based polymer material, sulfur (S), an organic material such as carbon fluoride, an inorganic material, and the like.

More preferred examples of the positive electrode active material for secondary battery include those which attains a high battery voltage. Examples of such positive electrode active material include a lithium-manganese composite oxide (e.g. $Li_xMn_2O_4$), lithium-nickel composite oxide (e.g. $Li_xNiO_2$), lithium-cobalt composite oxide (e.g. $Li_xCoO_2$), lithium-nickel-cobalt composite oxide (e.g. $LiNi_{1-y}Co_yO_2$), spinel type lithium-manganese-nickel composite oxide (e.g. $Li_xMn_{2-y}Ni_yO_4$), lithium-manganese-cobalt composite oxide (e.g. $LiMn_yCo_{1-y}O_2$), lithium iron phosphate (e.g. $Li_xFePO_4$), and the like. Each of x and y may preferably be within the range of 0 to 1.

Further, as the positive electrode active material, lithium-nickel-cobalt-manganese composite oxide of which a composition is represented by $Li_aNi_bCo_cMn_dO_2$ (provided that molar ratios a, b, c, and d satisfy $0 \leq a \leq 1.1$, $0.1 \leq b \leq 0.5$, $0 \leq c \leq 0.9$, $0.1 \leq d \leq 0.5$) may be used.

The number of kinds of the positive electrode active material to be used may be one or two or more.

In the case of using a nonaqueous electrolyte containing a room temperature molten salt, it is preferable to use lithium iron phosphate, $Li_xVPO_4F$ ($0 \leq x \leq 1$), lithium-manganese composite oxide, lithium-nickel composite oxide, or lithium-nickel-cobalt composite oxide from the viewpoint of cycle life and in order to suppress reactivity between the positive electrode active material and the room temperature molten salt.

The positive electrode is produced by, for example, suspending the positive electrode active material, a positive electrode conductive agent, and a binder into an appropriate solvent to obtain a slurry, coating the slurry on the positive electrode current collector, followed by drying to form the positive electrode active material-containing layer, and then pressing. Alternatively, the positive electrode active material, the positive electrode conductive agent, and the binder may be formed into pellets to be used for the positive electrode active material-containing layer.

Examples of the conductive agent include acetylene black, carbon black, graphite, and the like.

Examples of the binder include polytetrafluoroethylene (PTFE), polyvinylidene fluoride (PVdF), a fluorine-based rubber, an acrylic rubber, an acrylic resin, and the like.

A mixing ratio among the positive electrode active material, the conductive agent, and the binder may preferably be within such a range that 80 to 95 wt % of the positive electrode active material, 3 to 18 wt % of the conductive agent, and 2 to 17 wt % of the binder are mixed.

As the current collector, a metal foil such as an aluminum foil or an aluminum alloy foil may be used, for example.

A thickness of the aluminum foil or the aluminum alloy foil may preferably be 20 µm or less, more preferably 15 µm or less. A purity of the aluminum foil may preferably be 99 wt % or more. As the aluminum alloy, an alloy containing an element such as magnesium, zinc, or silicon is preferred. On the other hand, a content of a transition metal such as iron, copper, nickel, or chrome may preferably be 1 wt % or less.

A positive electrode density may preferably be 3 g/cm$^3$ or more.

2) Separator

As the separator, a porous separator is used. Examples of the porous separator include a porous film containing polyethylene, polypropylene, cellulose, or polyvinylidene fluoride (PVdF), a nonwoven fabric made from a synthetic resin, and the like. Among the above porous films, the porous film which is made from polyethylene, polypropylene, or polyethylene and polypropylene is preferred since it improves safety of the secondary battery.

3) Nonaqueous Electrolyte

A liquid nonaqueous electrolyte may be used as the nonaqueous electrolyte.

The liquid nonaqueous electrolyte is prepared by, for example, dissolving an electrolyte into an organic solvent.

Examples of the electrolyte include a lithium salt such as lithium perchlorate (LiClO$_4$), lithium hexafluorophosphate (LiPF$_6$), lithium tetrafluoroborate (LiBF$_4$), lithium arsenic hexafluoride (LiAsF$_6$), lithium trifluoromethanesulfonate (LiCF$_3$SO$_3$), and bistrifluoromethylsulfonylimide lithium [LiN(CF$_3$SO$_2$)$_2$]. The number of kinds of the electrolyte may be one or two or more.

The electrolyte may preferably be dissolved into the organic solvent within the range of 0.5 to 2.5 mol/L.

Examples of the organic solvent include a cyclic carbonate such as ethylene carbonate (EC), propylene carbonate (PC), and a vinylene carbonate (VC); a chain carbonate such as dimethyl carbonate (DMC), methylethyl carbonate (MEC), and diethyl carbonate (DEC); a cyclic ether such as tetrahydrofuran (THF) and 2-methyltetrahydrofuran (2MeTHF); a chain ether such as dimethoxyethane (DME); γ-butyrolactone (BL); acetonitrile (AN); sulfolane (SL); and the like. The organic solvents may be used alone or as a mixture containing two or more thereof.

Further, as the liquid nonaqueous electrolyte, a room temperature molten salt containing lithium ions may be used.

The room temperature molten salt means a salt of which at least a part turns into a liquid at a room temperature, and the room temperature means a temperature range within which a power source is ordinarily expected to operate. An upper limit of the temperature range within which a power source is ordinarily expected to operate is about 120° C. or 60° C. in some cases, and a lower limit thereof is about −40° C. or −20° C. in some cases.

As the lithium salt, those having a wide potential window, which are used for nonaqueous electrolyte batteries, may be used. Examples thereof include, but are not limited to, LiBF$_4$, LiPF$_6$, LiClO$_4$, LiCF$_3$SO$_3$, LiN(CF$_3$SO$_2$)$_2$, LiN(C$_2$F$_5$SO$_2$), LiN[CF$_3$SC(C$_2$F$_5$SO$_2$)]$_3$, and the like. The lithium salts may be used alone or in combination of two or more kinds thereof.

A content of the lithium salt may preferably be 0.1 to 3 mol/L, particularly preferably 1 to 2 mol/L. Since a resistance of the electrolyte is reduced by the content of the lithium salt of 0.1 mol/L or more, a large current/low temperature discharge performance is improved. By the content of the lithium salt of 3 mol/L or less, a melting point of the electrolyte is suppressed to a low value, thereby enabling to maintain the liquid form at the room temperature.

The room temperature molten salt may be the one having a quaternary ammonium organic cation or an imidazolium cation.

Examples of the quaternary ammonium organic cation include an imidazolium ion such as dialkylimidazolium and trialkylimidazolium, a tetraalkylammonium ion, an alkyl pyridinium ion, a pyrazolium ion, a pyrrolidinium ion, a piperidinium ion, and the like. The imidazolium cation is preferred.

Examples of the tetraalkylammonium ion include, but are not limited to, trimethylethylammonium ion, trimethylethylammonium ion, trimethylpropylammonium ion, trimethylhexylammonium ion, tetrapentylammonium ion, and the like.

Examples of the alkylpyridinium ion include, but are not limited to, N-methylpyridinium ion, N-ethylpyridinium ion, N-propylpyridinium ion, N-butylpyridinium ion, 1-ethyl-2-methylpyridinium ion, 1-butyl-4-methylpyridinium ion, 1-butyl-2,4-dimethylpyridinium ion, and the like.

The room temperature molten salts having the cations described above may be used alone or in combination of two or more kinds thereof.

Examples of the imidazolium cation include, but are not limited to, dialkylimidazolium ion, trialkylimidazolium ion, and the like.

Examples of the dialkylimidazolium ion include, but are not limited to 1,3-dimethylimidazolium ion, 1-ethyl-3-methylimidazolium ion, 1-methyl-3-ethylimidazolium ion, 1-methyl-3-butylimidazolium ion, 1-butyl-3-methylimidazolium ion, and the like.

Examples of the trialkylimidazolium ion include, but are not limited to, 1,2,3-trimethylimidazolium ion, 1,2-dimethyl-3-ethylimidazolium ion, 1,2-dimethyl-3-propylimidazolium ion, 1-butyl-2,3-dimethylimidazolium ion, and the like.

The room temperature molten salts having the cations described above may be used alone or in combination of two or more kinds thereof.

4) Case

As the case, a metal container having a plate thickness of 0.5 mm or less or a laminate film container having a plate thickness of 0.2 mm or less may be used. As the metal container, a metal can made from aluminum, an aluminum alloy, iron, stainless steel, or the like and has a rectangular shape or a cylindrical shape may be used. The plate thickness of the metal container may more preferably be 0.2 mm or less.

As the laminate film, a multilayer film which is obtainable by coating a metal foil with a resin film may be used. As the resin, a polymer such as polypropylene (PP), polyethylene (PE), nylon, or polyethylene terephthalate (PET) may be used. As the metal foil, an aluminum foil, an aluminum alloy foil, or the like may be used.

As the aluminum alloy, an alloy containing an element such as magnesium, zinc, or silicon is preferred. On the other hand, a content of a transition metal such as iron, copper, nickel, or chrome may preferably be 1 wt % or less. Accordingly, it is possible to drastically improve long-term reliability under a high temperature environment and a heat discharge performance.

5) Negative Electrode Terminal

The negative electrode terminal may be formed of a material having electrical stability and conductivity within a potential range of 0.4 V (vs. Li/Li$^+$) or more and 3 V (vs. Li/Li$^+$) or less. Specific examples of the material include an aluminum alloy containing an element such as Mg, Ti, Zn, Mn, Fe, Cu, or Si and aluminum. In order to reduce a contact resistance, a material which is the same as that of the negative electrode current collector is preferred.

6) Positive Electrode Terminal

The positive electrode terminal may be formed of a material having electrical stability and conductivity within a potential range of 3 V (vs. Li/Li$^+$) or more and 5 V (vs. Li/Li$^+$) or less. Specific examples of the material include an aluminum alloy containing an element such as Mg, Ti, Zn, Mn, Fe, Cu, or Si and aluminum. In order to reduce a contact resistance, a material which is the same as that of the positive electrode current collector is preferred.

Figure 4:
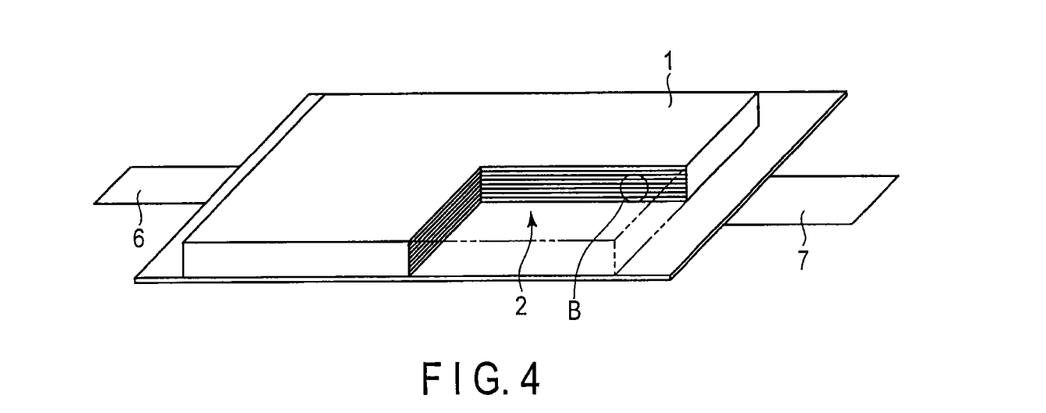
FIG. 4 is a partially broken perspective view schematically showing the nonaqueous electrolyte battery of the second embodiment.
Figure 5:
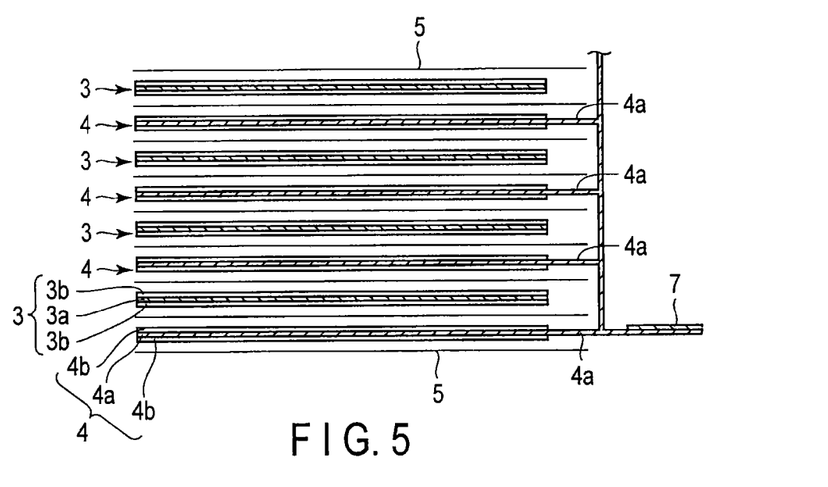
FIG. 5 is an enlarged sectional view showing a part-B of FIG. 4.

The nonaqueous electrolyte battery according to the second embodiment is not limited to those having the above-described configuration shown in FIG. 1 and FIG. 2 and may have the configuration which is shown in FIG. 4 and FIG. 5. FIG. 4 is a partially broken perspective view schematically showing another flat-type nonaqueous electrolyte battery according to the second embodiment, and FIG. 5 is an enlarged sectional view showing a part-B of FIG. 4.

As shown in FIG. 4, a laminate-type electrode group 2 is housed in a case 1 made from a laminate film. As shown in FIG. 5, the laminate-type electrode group 2 has a configuration that a positive electrode 3 and a negative electrode 4 are alternately laminated with a separator 5 being disposed therebetween. Each of the plurality of positive electrodes 3 comprises a positive electrode current collector 3a and a positive electrode active material-containing layer 3b which is supported on each of both surfaces of the positive electrode current collector 3a. Each of the plurality of negative electrodes 4 comprises a negative electrode current collector 4a and a negative electrode active material-containing layer 4b supported on each of both surfaces of the negative electrode current collector 4a. One side of the negative electrode current collector 4a of each of the negative electrodes 4 is projected from the positive electrode 3. The negative electrode current collectors 4a projected from the positive electrodes 3 are electrically connected to a strip-shaped negative electrode terminal 7. A leading end of the strip-shaped negative electrode terminal 7 is lead out from the case 1 to the outside. Though not shown in FIG. 5, one side of each of the positive electrode current collectors 3a of the positive electrodes 3, which positioned opposite to the side from which the negative electrode current collector 4a is projected, is projected from the negative electrode 4. The positive electrode current collectors 3a projected from the negative electrodes 4 are electrically connected to a strip-shaped positive lectrode terminal 6. A leading end of the strip-shaped positive electrode terminal 6 is lead out from the case 1 to the outside. A direction in which the positive electrode terminal 6 is lead out from the case 1 is opposite to a direction in which the negative electrode terminal 7 is lead out from the case 1.

Figure 6:
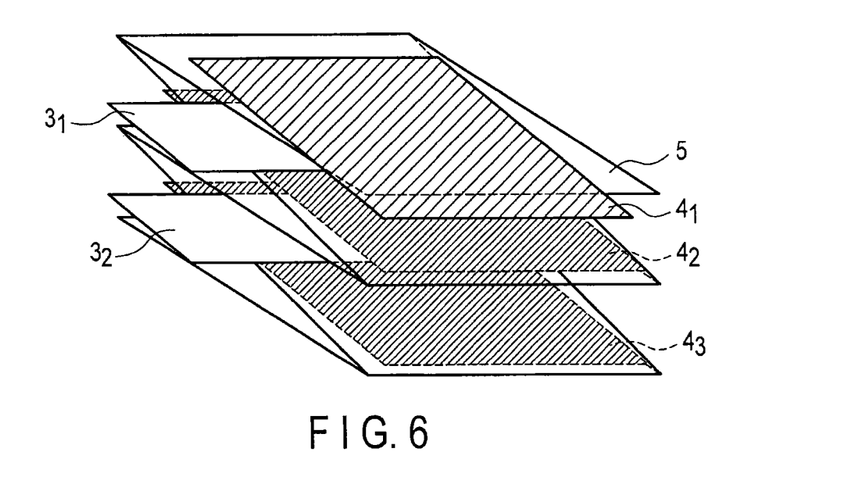
FIG. 6 is a perspective view showing an electrode group used in the nonaqueous electrolyte battery of the second embodiment.

Though the winding structure as shown in FIG. 1 and FIG. 2 and the laminate structure shown in FIG. 4 and FIG. 5 are described above as structures of the electrode group, the structures are not limitative. Further, in the electrode group including positive electrodes and negative electrodes and having the laminate structure, the separator may be folded in a zigzag pattern as shown in FIG. 6. A band-shaped separator 5 is folded in a zigzag shape. A strip-like negative electrode 4$_1$ is laminated on the folded separator. A strip-like positive electrode 3$_1$, a strip-like negative electrode 4$_2$, a strip-like positive electrode 3$_2$ and a strip-like negative electrode 4$_3$ are inserted in this order from above into the overlapped part of the separators 5. An electrode group having a laminate structure is obtained by alternately disposing the positive electrode 3 and the negative electrode 4 between the overlapped parts of the separator 5 folded in a zigzag shape in this manner.

According to the nonaqueous electrolyte battery of the second embodiment described above, the energy density and the input-output performance of the negative electrode are improved since the electrode of the first embodiment is used as the negative electrode, and, as a result, it is possible to realize a nonaqueous electrolyte battery having high energy density and excellent input-output performance.

(Third Embodiment)

A battery pack according to the third embodiment has the nonaqueous electrolyte battery or a plurality of the nonaqueous electrolyte batteries according to the second embodiment. It is preferable to use the nonaqueous electrolyte battery according to the second embodiment as a unit cell and to form a battery module by electrically connecting the unit cells in series or in parallel.

The nonaqueous electrolyte battery according to the second embodiment is suitably used for obtaining a battery module, and the battery pack according to the third embodiment is excellent in cycle performance. These features will be described below.

When retention of the nonaqueous electrolyte is improved, it is possible to attain a sufficient contact between a surface of the negative electrode active material and the nonaqueous electrolyte, and, therefore, a uniform lithium ion concentration is readily attained in the negative electrode active material. As a result, since an over-voltage is hardly applied, i.e. since local overcharge-overdischarge hardly occurs, it is possible to equalize a utilization rate of the negative electrode active material. Thus, it is possible to considerably diminish an individual difference in capacity and an individual difference in impedance of batteries. As a result, it is possible to reduce a battery voltage fluctuation at full charge state which is otherwise caused by the individual difference in battery capacity in the battery module of serial connection, for example. Therefore, the battery pack according to the third embodiment is excellent in controllability of the battery module and enables to attain the cycle performance improvement.

Figure 7:
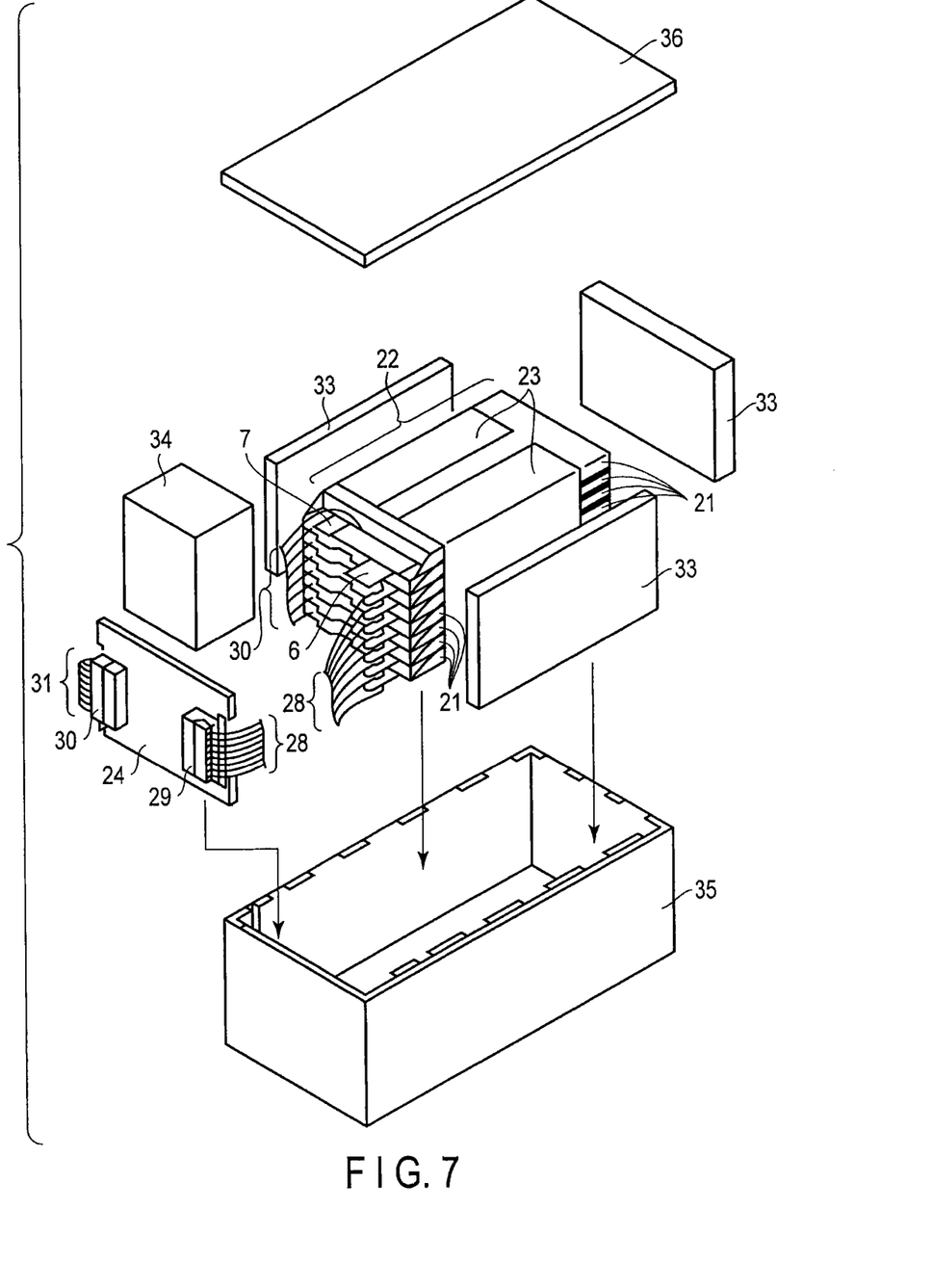
FIG. 7 is an exploded perspective view showing a battery pack according to a third embodiment.
Figure 8:
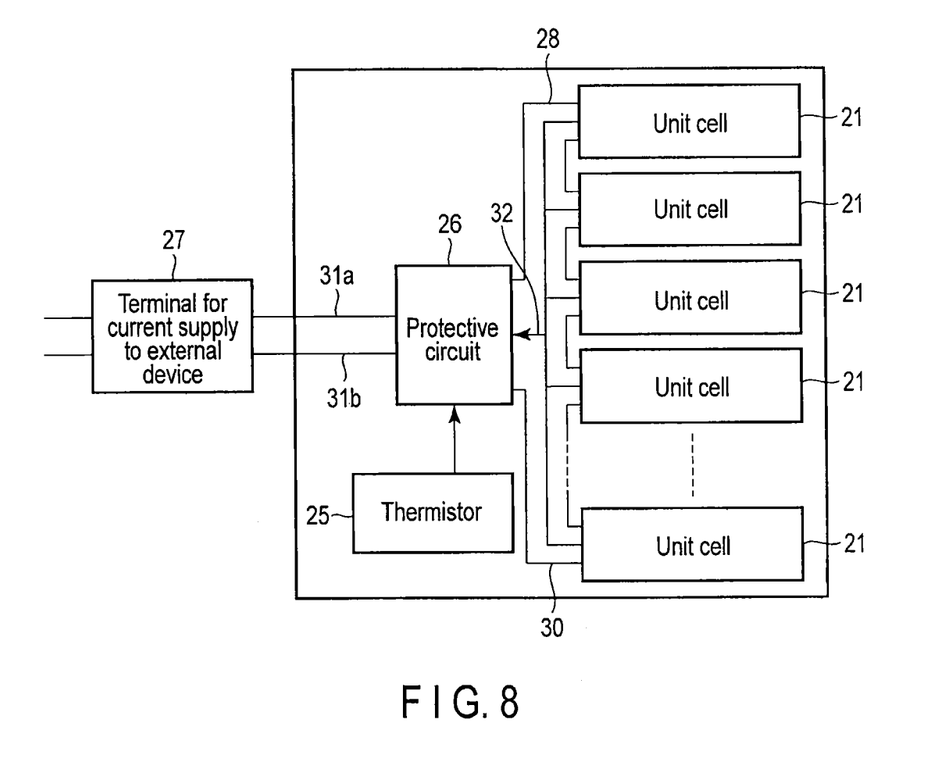
FIG. 8 is a block diagram showing an electric circuit of the battery pack of FIG. 7.

A unit cell 21 in the battery pack of FIG. 7 is formed of the flat-type nonaqueous electrolyte battery shown in FIG. 1, for example, but the unit cell 21 is not limitative. The flat-type nonaqueous electrolyte battery shown in FIG. 4 may also be used. The plurality of unit cells 21 are laminated in such a manner that the directions of projections of the positive electrode terminals 6 and the negative electrode terminals 7 are identical to each other. As shown in FIG. 8, the unit cells 21 are serially connected to form a battery module 22. The unit cells 21 are integrated into the battery module 22 by using an adhesive tape 23 as shown in FIG. 7.

A printed circuit board 24 is disposed at a lateral surface from which the positive electrode terminals 6 and the negative electrode terminals 7 are projected. As shown in FIG. 8, a thermistor 25, a protective circuit 26, and a terminal 27 for carrying a current to an external device are mounted to the printed wiring board 24.

As shown in FIG. 7 and FIG. 8, positive electrode wirings 28 of the battery module 22 are electrically connected to a positive electrode connector 29 of the protective circuit 26 of the printed wiring board 24. Negative electrode wirings 30 of the battery module 22 are electrically connected to a negative electrode connector 31 of the protective circuit 26 of the printed wiring board 24.

The thermistor 25 detects a temperature of the unit cell 21, and a detection signal is sent to the protective circuit 26. The protective circuit 26 interrupts a plus wiring 31a and a minus wiring 31b between the protective circuit and the terminal for carrying current to external device under predetermined conditions. The predetermined conditions mean a temperature detected by the thermistor which is equal to or more than a predetermined temperature and detection of an over-charge, an over-discharge, or an over-current of the unit cell 21, and the like. The detection method is performed on each of the unit cells 21 or the battery module 22. In the case where the detection is performed on each of the unit cells 21, a battery voltage may be detected, or a positive electrode potential or a negative electrode potential may be detected. In the latter case, a lithium electrode to be used as a reference electrode is inserted in each of the unit cells 21. In the case of FIG. 8, a wiring 32 for voltage detection is connected to each of the unit cells 21, and the detection signals are sent to the protective circuit 26 via the wrings 32.

In the battery module 22, on each of three surfaces other than the lateral surface from which the positive electrode terminals 6 and the negative electrode terminals 7 are projected, a protection sheet 33 made from a rubber or a resin is disposed. Between the lateral surface from which the positive electrode terminals 6 and the negative electrode terminals 7 are projected and the printed wiring board 24, a protection block 34 in the form of a block made from a rubber or a resin is disposed.

The battery module 22 is housed in a housing container 35 together with the protection sheets 33, the protection block 34, and the printed wiring board 24. More specifically, the protection sheets 33 are disposed at inner surfaces in a length direction and one of inner surfaces in a width direction of the housing container 35, and the printed wiring board 24 is disposed at the other inner surface in the width direction of the housing container 35. The battery module 22 is positioned in a space defined by the protection sheets 33 and the printed wiring board 24. A cover 36 is attached to a top surface of the housing container 35.

A heat-shrinkable tape may be used in place of the adhesive tape 23 for fixing the battery module 22. In this case, the battery module is bound by disposing the protection sheet on each of the lateral surfaces of the battery module, looping the heat-shrinkable tube around, and subjecting the heat shrinkable tube to heat shrinkage.

Though the unit cells 21 shown in FIGS. 7 and 8 are serially connected, they may be connected in parallel in order to increase a battery capacity. Of course, assembled battery packs may be connected in series or in parallel.

Further, the embodiments of the battery pack may be changed appropriately depending on a usage. As the usage of the battery pack of the third embodiment, battery packs in which the cycle performance at large current is desired are preferred. Specific examples of the usage include a usage for a power source for a digital camera and an in-vehicle usage for a two-wheeled or four-wheeled hybrid electric vehicle, a two-wheeled or four-wheeled electric vehicle, an electric power-assisted bicycle, and the like. The in-vehicle usage is suitable.

In the case of containing as the nonaqueous solvent a mixture solvent obtainable by mixing at least two kinds selected from the groups consisting of propylene carbonate (PC), ethylene carbonate (EC), and γ-butyrolactone (GBL), or γ-butyrolactone (GBL), a usage in which a high temperature performance is desired is preferred. Specific embodiments thereof include the above-described in-vehicle usage.

According to the battery pack of the third embodiment described above, since the nonaqueous electrolyte battery of the second embodiment is provided, it is possible to realize a battery pack having high energy density and excellent input-output performance.

Hereinafter, examples will be described.

EXAMPLES 1 AND 2 AND COMPARATIVE EXAMPLES 1 and 2

<Production of Negative Electrode>

As a negative electrode active material, $TiO_2(B)$ containing single primary particles and secondary particles resulted from aggregation of the primary particles and having a primary particle diameter of 1.0 μm and a secondary particle diameter of 15 μm, an average lithium absorption potential of 1.6 V (vs. $Li/Li^+$), and a specific surface area of 20 $m^2/g$ detected by BET method through $N_2$ adsorption was prepared. A particle diameter of the negative electrode active material was measured by using a laser diffractometry type particle size distribution measurement device (Microtrack MT3000 manufactured by Nikkiso Co., Ltd.).

The negative electrode active material, acetylene black as a conductive material, and polyvinylidene fluoride (PVdF) having an average molecular weight of $4 \times 10^5$ are added to a N-methylpyrrolidone (NMP) solution at a weight ratio of 95:2.5:2.5 and then mixed to prepare a slurry. The obtained slurry was coated on an aluminum foil having a thickness of 15 μm, followed by drying.

From the electrode after drying, negative electrodes each having an electrode density of 1.9, 2.1, 2.3, and 2.4 $g/cm^3$ were produced by adjusting a pressing pressure in order to measure diameter distribution of pores by mercury porosimetry and a rate performance using a three-electrode cell.

A diameter distribution of pores of each of the negative electrodes was measured by mercury porosimetry. As measurement device for a diameter distribution of pores, Shimadzu Autopore 9520 was used. The sample was obtained by cutting the negative electrode into pieces each having 50×50 mm to attain an identical sample weight. From the diameter distribution of pores by mercury porosimetry, a first mode diameter at a first peak, a second mode diameter at a second peak, and a pore volume were detected. The pore volume is a pore volume per gram (mL/g) of a negative electrode weight excluding a negative electrode current collector weight.

It should be noted that the analytical principle of the mercury porosimetry is based on Washburn's equation (1):

$$D = -4\gamma \cos\theta / P \qquad \text{Equation (1)}$$

Here, P is a pressure to be applied, D is a pore diameter, γ is the surface tension of mercury and is 480 dyne·$cm^{-1}$, and θ is a contact angle of mercury with the wall surface of pores and is 140° γ and θ are constants and therefore, the relation between the applied pressure P and the pore diameter D is found from Washburn's equation. If mercury penetration volume at this time is measured, the pore diameter and its volumetric distribution can be found. As to the details of measuring method, principle and the like, please refer to, for example, Motoji Zimpo et al., "Microparticle Handbook" Asakura Shoten, (1991) and Sohachiro Hayakawa, "Powder Property Measuring Method", Asalura Shoten (1978).

Figure 9:
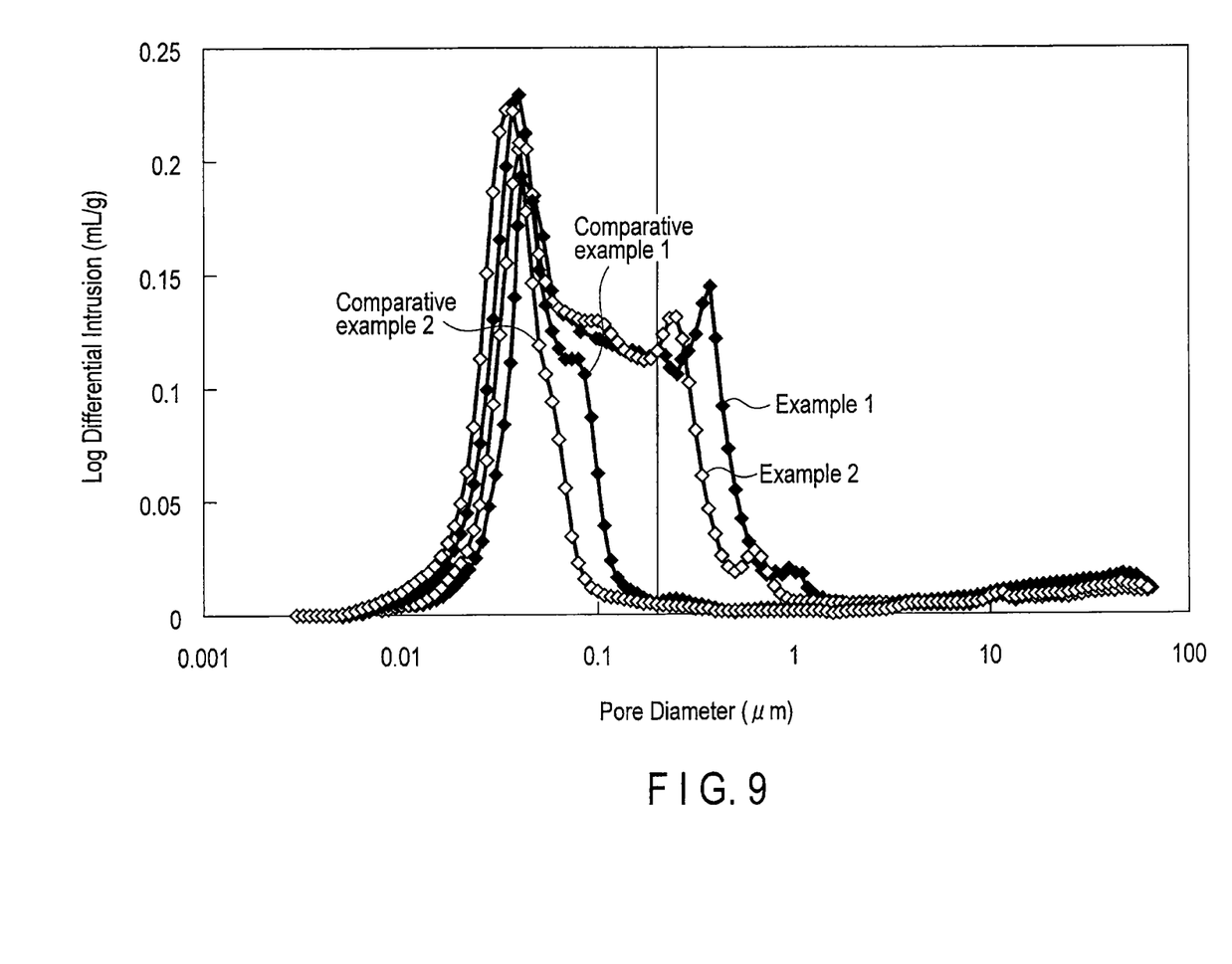
FIG. 9 is a diagram showing diameter distributions of pores detected by mercury porosimetry of the negative electrodes of Examples 1 and 2 and Comparative Examples 1 and 2.

The detected diameter distributions of pores are shown in FIG. 9. Shown in FIG. 9 are the diameter distributions of pores indicated by using the log differential intrusion (mL/g) as the vertical axis and the pore diameter (μm) as the horizontal axis. The log differential intrusion (mL/g) indicates a value per gram of the negative electrode weight excluding the negative electrode current collector. Each of Examples 1 and 2 and Comparative Examples 1 and 2 has the first peak within a pore diameter range of 0.01 μm or more and 0.1 μm or less. In each of the Examples 1 and 2, the second peak of the pore diameter exists within the range exceeding 0.2 μm and being equal to or less than 1 μm, and a peak height of the first peak is higher than a peak height of the second peak. In contrast, the second peak did not appear in Comparative Examples 1 and 2. The first mode diameters, the second mode diameters, and the pore volumes of Examples 1 and 2 and Comparative Examples 1 and 2 are shown in Table 1.

<Rate Performance Evaluation>

The rate performance was measured by producing a three-electrode cell by the method described below.

The negative electrode was cut to obtain a negative electrode having the size of 2×2 cm to be used as a working electrode. The working electrode and a counter electrode made from a lithium metal foil having the size of 2.0×2.0 cm were opposed to each other with a glass filter as a separator being disposed therebetween, and a lithium metal was disposed as a reference electrode in such a manner that the reference electrode did not contact the working electrode and the counter electrode. The electrodes were placed in a three-electrode glass cell, and the working electrode, the counter electrode, and the reference electrode are connected to terminals of the glass cell. 25 mL of an electrolyte solution was poured into the glass cell to attain a state in which the separator and the electrodes are sufficiently impregnated with the electrolyte solution, and then the glass container was tightly sealed. The rate performance evaluation was conducted by placing the thus-produced glass cell in a thermostatic bath at 25° C., setting a current density at a charge side constantly to 1.0 C, and varying a current density at a discharge side to 0.2, 1.0, 2.0, 3.0, 4.0, and 5.0 C. A discharge capacity when a discharge rate was 1 C is taken as 100% discharge capacity to indicate discharge capacities at other discharge rates, and the results are shown in Table 2. A composition of the electrolyte solution was obtained by dissolving 1 mol/L of lithium hexafluorophosphate (LiPF$_6$) into a solvent obtained by mixing ethylene carbonate and diethyl carbonate at a volume rate of 1:2.

Figure 10:
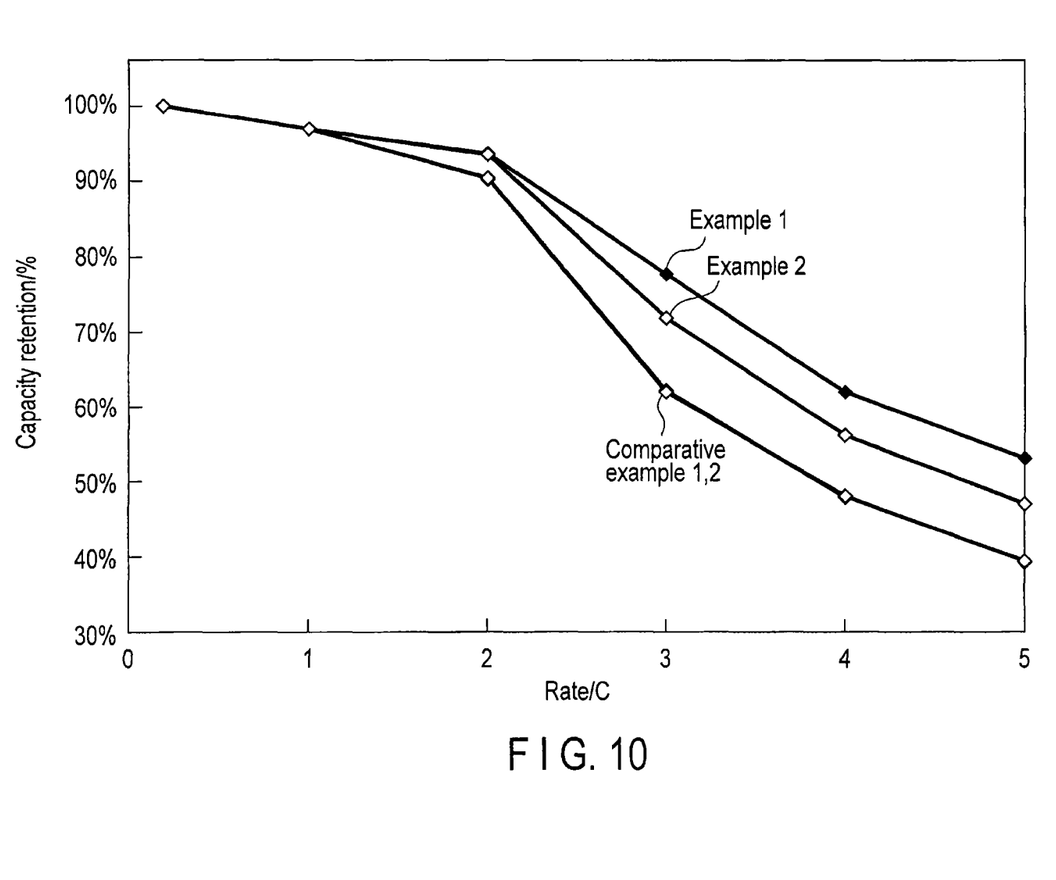
FIG. 10 is a graph showing a relationship between a discharge rate and capacity retention of the nonaqueous electrolyte batteries of Examples 1 and 2 and Comparative Examples 1 and 2.

The results of the negative electrode density and the first and second mode diameters are shown in Table 1; the graph of the measurement of the diameter distributions of pores is shown in FIG. 9; and the results of the rate performance of the three-electrode cell are shown in Table 2. Further, a relationship between the discharge rate and the capacity retention of Examples 1 and 2 and Comparative Examples 1 and 2 is shown in FIG. 10.

TABLE 1

|  | Electrode density (g/cm$^3$) | First mode diameter (μm) | Second mode diameter (μm) | Pore volume (mL/g) |
| --- | --- | --- | --- | --- |
| Example 1 | 1.9 | 0.042 | 0.38 | 0.18 |
| Example 2 | 2.1 | 0.041 | 0.24 | 0.15 |
| Comparative Example 1 | 2.3 | 0.040 | Not observed | 0.12 |
| Comparative Example 2 | 2.4 | 0.036 | Not observed | 0.10 |

TABLE 2

| | Rate Test Efficiency | | | | | |
| --- | --- | --- | --- | --- | --- | --- |
| | 0.2 C | 1 C | 2 C | 3 C | 4 C | 5 C |
| Example 1 | 100% | 96.7% | 93.3% | 77.5% | 61.9% | 53.0% |
| Example 2 | 100% | 96.7% | 93.2% | 71.9% | 56.1% | 46.9% |
| Comparative Example 1 | 100% | 96.8% | 90.0% | 62.2% | 48.0% | 39.3% |
| Comparative Example 2 | 100% | 96.7% | 90.3% | 61.8% | 48.2% | 39.6% |

As is apparent from Table 1, in each of the batteries of Examples, the second peak is shifted to a direction of reduction of pore diameter along with an increase in electrode density.

As is apparent from FIG. 9, the second peak exists until the electrode density is 2.1 g/cm$^3$ after the pressing, but the second peak is not detected when the electrode density is increased to 2.3 and 2.4 g/cm$^3$. It is considered that the no detection was caused because crushing or destruction of the secondary particles was promoted.

The rate performance in relation to FIG. 9 is shown in Table 2 and FIG. 10. From Table 2 and FIG. 10, it is recognized that the first peak appears within the pore diameter range of 0.01 μm to 0.1 μm, and the rate performance is deteriorated along with an increase in electrode density in the case where the pore volume is from 0.1 mL/g to 0.3 mL/g. Further, little difference is observed between Comparative Example 1 (density: 2.3 g/cm$^3$) and Comparative Example 2 (2.4 g/cm$^3$). This observation is correlative with the second peak of the diameter distributions of pores. More specifically, in the case where the first peak appears within the pore diameter range of 0.01 μm to 0.1 μm and the pore volume is from 0.1 mL/g to 0.3 mL/g, crushing of the secondary particles is suppressed when the second peak exists within the pore diameter range of 0.2 μm (exclusive) to 1 μm (inclusive), resulting in improvement of the rate performance because of the suppression of crushing. Conversely, the secondary particles are crushed when the density is increased, and the rate performance is deteriorated when a peak exists within the pore diameter range of 0.2 μm or less and the second peak is not detected as Comparative Examples 1 and 2. The difference in rate performance is not observed when the secondary particles are scarce.

Though the rate performance was evaluated by using the three-electrode cell, the same results are obtained by combining the negative electrode of Examples, for example, with a positive electrode produced by the method described below.

A slurry was obtained by adding 90 wt % of lithium cobalt oxide (LiCoO$_2$) powder as a positive electrode active material, 3 wt % of acetylene black, 3 wt % of graphite, and 4 wt % of polyvinylidene fluoride (PVdF) to N-methylpyrrolidone (NMP), followed by mixing. The slurry was coated on each of both surfaces of a current collector made from an aluminum foil having a thickness of 15 μm, followed by drying and pressing, thereby obtaining a positive electrode having an electrode density of 3.0 g/cm$^3$.

While certain embodiments have been described, these embodiments have been presented by way of example only, and are not intended to limit the scope of the inventions. Indeed, the novel embodiments described herein may be embodied in a variety of forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
a current collector;
an active material-containing layer formed on the current collector and containing an active material having a lithium absorption potential of 0.4 V (vs. Li/Li$^+$) or more, wherein the active material contains secondary particles which contain aggregates of primary particles, wherein the primary particles have a primary particle diameter of 0.1 μm or more and 10 μm or less, and wherein the secondary particles have a secondary particle diameter of 1 μm or more and 30 μm and less;
a first peak having a mode diameter of 0.01 to 0.1 μm in a diameter distribution of pores detected by mercury porosimetry;
a second peak having a mode diameter of 0.2 μm (exclusive) to 0.5 μm (inclusive) in the diameter distribution of pores; and
a pore volume detected by the mercury porosimetry within a range of 0.1 to 0.3 mL per gram of a weight of the electrode excluding a weight of the current collector.

2. The electrode according to claim 1,
wherein the active material consists of a titanium composite oxide having a monoclinic system β-type structure.

3. The electrode according to claim 2,
wherein a specific surface area detected by a BET method of the titanium composite oxide is within a range of 1 to 30 m$^2$/g.

4. The electrode according to claim 2,
wherein the titanium composite oxide is in a form of secondary particles comprising aggregation of fibrous primary particles.

5. The electrode according to claim 4,
wherein a diameter of the fibrous primary particles is within a range of 0.1 to 10 μm, and a diameter of the secondary particles is within a range of 1 to 30 μm.

6. The electrode according to claim 1,
wherein the mode diameter of the first peak is within a range of 0.03 to 0.05 μm.

7. The electrode according to claim 1,
wherein the mode diameter of the second peak is within a range of 0.2 μm (exclusive) to 0.38 μm (inclusive).

8. The electrode according to claim 1,
wherein the pore volume per gram of the electrode weight excluding the weight of the current collector is within a range of 0.13 to 0.2 mL.

9. The electrode according to claim 1,
wherein a density of the electrode is within a range of 1.9 g/cm$^3$ (inclusive) to 2.1 g/cm$^3$ (exclusive).

10. The electrode according to claim 1,
wherein a height of the first peak is higher than a height of the second peak.

11. A nonaqueous electrolyte battery comprising:
a positive electrode;
the electrode defined in claim 1 as a negative electrode; and
a nonaqueous electrolyte.

12. A battery pack comprising the nonaqueous electrolyte battery defined in claim 11.

13. The electrode according to claim 1,
wherein the active material is selected from the group consisting of titanium-based oxide, lithium titanium oxide, and lithium titanium composite oxide.

14. The electrode according to claim 13,
wherein the lithium titanium composite oxide is lithium titanate having a spinel structure or lithium titanate of a ramsdellite type.

15. The electrode according to claim 14,
wherein the lithium titanate having the spinel structure has a composition of $Li_{4+x}Ti_5O_{12}$, wherein x is a value which is capable of changing by charge-discharge, and satisfies $0 \leq x \leq 3$.

16. The electrode according to claim 14,
wherein the lithium titanate of the ramsdellite type has a composition of $Li_{2+y}Ti_3O_7$, wherein y is a value which is capable of changing by charge-discharge.

17. The electrode according to claim 1, wherein the active material comprises secondary particles.

18. The electrode according to claim 17, wherein the second peak represents an existence of the secondary particles.

19. The electrode according to claim 17, wherein the primary particles have a primary particle diameter of 0.5 μm or more and 3 μm or less, and wherein the secondary particles have a secondary particle diameter of 10 μm or more and 20 μm and less.

* * * * *